(12) United States Patent
Pegg et al.

(10) Patent No.: US 9,441,532 B2
(45) Date of Patent: Sep. 13, 2016

(54) ENGINE ASSEMBLY WITH TURBINE GENERATOR CONTROL

(71) Applicant: FORD GLOBAL TECHNOLOGIES, LLC, Dearborn, MI (US)

(72) Inventors: Ian A. Pegg, Chelmsford (GB); Robert Helle-Lorentzen, Chelmsford (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 119 days.

(21) Appl. No.: 13/928,637

(22) Filed: Jun. 27, 2013

(65) Prior Publication Data

US 2014/0007574 A1    Jan. 9, 2014

(30) Foreign Application Priority Data

Jul. 5, 2012  (GB) .................................. 1211986.3

(51) Int. Cl.
| | |
|---|---|
| *F02B 37/00* | (2006.01) |
| *F02G 5/02* | (2006.01) |
| *F02B 63/04* | (2006.01) |
| *F01N 5/04* | (2006.01) |
| *F01K 23/00* | (2006.01) |
| *F01N 13/00* | (2010.01) |
| *F01N 3/035* | (2006.01) |
| *F02D 21/08* | (2006.01) |

(52) U.S. Cl.
CPC ............... *F02B 37/00* (2013.01); *F01K 23/00* (2013.01); *F01N 5/04* (2013.01); *F01N 13/009* (2014.06); *F02B 63/042* (2013.01); *F02G 5/02* (2013.01); *F01N 3/035* (2013.01); *F01N 2240/36* (2013.01); *F02D 2021/083* (2013.01); *Y02T 10/144* (2013.01); *Y02T 10/16* (2013.01); *Y02T 10/163* (2013.01); *Y02T 10/6295* (2013.01)

(58) Field of Classification Search
CPC .......... F02B 63/00; F02B 63/42; F02G 5/02; F02M 25/0709
See application file for complete search history.

(56) References Cited

U.S. PATENT DOCUMENTS

| | | | | |
|---|---|---|---|---|
| 5,079,913 | A * | 1/1992 | Kishishita | F02B 63/04 60/597 |
| 5,881,559 | A | 3/1999 | Kawamura | |
| 6,922,997 | B1 | 8/2005 | Larson et al. | |
| 7,383,684 | B2 * | 6/2008 | Vuk | F02B 37/164 60/597 |
| 7,757,666 | B2 * | 7/2010 | Whitney | F02D 37/02 123/198 DB |
| 7,834,582 | B2 * | 11/2010 | Luan | H02J 7/1492 320/104 |
| 8,063,609 | B2 * | 11/2011 | Salasoo | B60L 3/0046 320/103 |
| 8,091,357 | B2 * | 1/2012 | Robel | F02B 37/013 60/597 |
| 8,763,385 | B2 * | 7/2014 | Leone et al. | 60/397 |
| 8,967,116 | B2 * | 3/2015 | Leone et al. | 123/399 |
| 2005/0050887 | A1 * | 3/2005 | Frank et al. | 60/608 |
| 2006/0113799 | A1 * | 6/2006 | Obayashi et al. | 290/40 B |

(Continued)

FOREIGN PATENT DOCUMENTS

| | | | | |
|---|---|---|---|---|
| JP | 2005127261 A * | 5/2005 | | F02M 25/07 |
| JP | 2006238700 A * | 9/2006 | | |
| WO | WO2006117701 A2 | 2/2006 | | |

*Primary Examiner* — Mary A Davis
(74) *Attorney, Agent, or Firm* — David B. Kelley; MacMillan, Sobanski & Todd, LLC

(57) ABSTRACT

An engine assembly includes an engine control unit, an internal combustion engine having an exhaust, a turbine driven in use by said exhaust, and an energy storage mechanism for storing energy recovered from said exhaust by said turbine, wherein the engine control unit is operable to vary the rate of storing energy in the energy storage mechanism.

14 Claims, 3 Drawing Sheets

(56) References Cited

U.S. PATENT DOCUMENTS

| | | | |
|---|---|---|---|
| 2006/0162333 A1* | 7/2006 | Isogai | 60/600 |
| 2007/0151241 A1 | 7/2007 | Arnold | |
| 2009/0107142 A1* | 4/2009 | Russell et al. | 60/608 |
| 2011/0022289 A1* | 1/2011 | Hofbauer | 701/103 |
| 2011/0094224 A1* | 4/2011 | Sheidler | F02B 37/00 60/605.2 |
| 2011/0094485 A1* | 4/2011 | Vuk et al. | 60/605.2 |
| 2013/0255267 A1* | 10/2013 | Elkady et al. | 60/772 |

* cited by examiner

ENGINE ASSEMBLY WITH TURBINE GENERATOR CONTROL

BACKGROUND OF THE INVENTION

1. Field of the Invention

This invention relates generally to an engine assembly for a hybrid electric vehicle utilizing turbo-compounding.

2. Description of the Prior Art

Due to increasing concern over global warming, stringent emissions regulations and the cost of fuel, there is a general drive to increase the efficiency of internal combustion engines.

Hybrids vehicles were introduced to recover energy during vehicle deceleration and then make use of it to accelerate/drive the vehicle or by supplying electrical demand. However this can result in a major increase in cost and weight, whilst this does not recover other forms of waste energy, such as the waste heat down the exhaust.

WO2006/117701 describes an engine unit for a hybrid vehicle comprising a gas turbine mounted in the engines exhaust duct which is mechanically coupled to an electricity generator. The recovered energy may be used, for example, for driving motors or compressing air to boost the engine.

US2007/0151241 discloses an internal combustion engine including an exhaust turbine coupled to a generator and a controller to direct electricity generated to an electric motor or to a power storage device. Thus efficiencies are claimed for the more efficient use of electrical energy generated by the generator run by a turbine, compared to direct mechanical couplings directing the turbine's energy back to a crankshaft.

SUMMARY OF THE INVENTION

An engine assembly includes an engine control unit, an internal combustion engine having an exhaust, a turbine driven in use by said exhaust, and an energy storage mechanism for storing energy recovered from said exhaust by said turbine, wherein the engine control unit is operable to vary the rate of storing energy in the energy storage mechanism.

The engine assembly can be incorporated in a hybrid electric vehicle.

As the rate of storing energy in the energy storage mechanism is variable the amount of back pressure created upstream of the turbine is also varied. In this way, the engine control unit can control a variety of engine aspects. Moreover the downstream pressure is also affected and can be used to control other engine aspects.

In a first embodiment, the engine control unit so controls the output power of the engine, optionally in lieu of a throttle intake valve, by manipulating the back pressure of the engine via the turbine. By reducing the air flow in such a manner energy can be recovered via the turbine, rather than irreversibly throttling of the air flow via an intake throttle valve.

In a second embodiment, the engine control unit so controls the recirculation of exhaust gases in an exhaust gas recirculation loop. Conventionally, a variable geometry turbocharger (VGT) may be manipulated in order to create sufficient pressure to recirculate exhaust gases, or if the exhaust gas recirculation is taken downstream of a turbocharger, an exhaust gas throttle valve is conventionally used for such a purpose. In any case this is inefficient and embodiments of the present invention can provide for such pressure increases and recover some of the energy required to do this, which is presently wasted. Using the turbo-compounding machine to increase the pressure differential across the EGR system can be deployed on low pressure and high pressure systems.

A high pressure EGR loop is normally one where the gas recirculation is started upstream of a turbocharger turbine and recirculated back to a position downstream of the turbocharger compressor.

A low pressure EGR loop is normally one where the gas recirculation is started downstream of a turbocharger turbine (or other device causing depressurization of the gas) and recirculated back to a position upstream of the turbocharger compressor (or other said device).

Varying the rate of storing energy in the energy storage mechanism may include varying the load on the turbine.

The energy storage mechanism is often a battery, but it may include any suitable device such as a capacitor, or a flywheel.

Normally a generator is included in the engine assembly. For embodiments where the engine assembly comprises a generator, the engine control unit may be operable to vary the voltage demanded by the generator which varies the rate of storing energy and so varies the load of the turbine and the back pressure created.

One example of a generator varying the load is described in U.S. Pat. No. 7,812,467 (incorporated herein by reference in its entirety) which is a method of electrical load control on an IC engine.

Embodiments of the invention allow energy to be recovered under approximately all engine running conditions. Indeed inventors of the present invention have noted that approximately a third of the engine energy is often wasted down the exhaust.

For embodiments of the present invention a large proportion of this can be recovered, as described herein.

An advantage of certain embodiments of the invention is that they recover waste energy when the engine is operating under various loads and not just when the vehicle is braking, as is the case of many conventional hybrids. This energy may be used to power the vehicle.

A further advantage of certain embodiments is that it is also possible to use the energy to propel the vehicle at the same time as energy is being generated, via an electric motor (in contrast to conventional hybrids where energy is generated on braking and not used at this time).

An advantage of certain embodiments of the invention is that it is possible to reduce the size of the energy storage device on the hybrid because it can be used more readily compared to certain known hybrids.

For example, the engine control unit may be operated to increase the load on the engine by increasing the rate of storing energy in the energy storage mechanism, moving the engine to a higher efficiency operating point. When sufficient energy has been stored via the turbine of the present invention, the engine may be disengaged and the vehicle run from the energy storage mechanism. Afterwards, the engine may be engaged again, and the same procedure repeated indefinitely. Such a "pulse and cruise" system can be a particularly efficient use of fuel.

An advantage of certain embodiments of the invention is that although this system may increase the engine envelope, it avoids the need to put a large electrical machine between the engine and the gearbox. Moreover, the overall length of the engine and gearbox/clutch system is often the determining factor in a vehicle design.

A further advantage of certain embodiments of the invention is that they allow better package freedom.

Kinetic energy could also be recovered by this system solely or combined with a second generator in the driveline system (including engine mounted). The second generator may comprise the alternator. Thus, the vehicle may take electrical power for on-board electronics from the energy storage mechanisms. Thus, a further advantage of certain embodiments of the invention is that the alternator may be removed altogether and have no Front End Accessory Drive (FEAD). This again will improve fuel economy and improve the cost vs. benefit equation particularly because the present invention captures kinetic energy rather than energy that would otherwise be used to drive the vehicle.

An advantage of certain embodiments of the invention is that the electrical machine and turbine can be designed to run at the same speed range without major compromise of either. This means that there is no need for reduction gears between the units.

The vehicle may also be adapted to recover some of the energy lost when braking.

The engine control unit may be configured to use the engine as an air pump when decelerating. The air pumped through the engine can then in turn power the turbine and recover more energy when decelerating (or travelling downhill). In contrast conventional engines will close a throttle valve wasting the kinetic energy of the vehicle.

The engine control unit may control the energy storage rate in order increase the conditions suitable to regenerate a particulate trap.

The engine control unit may control the energy storage rate in order increase the conditions suitable for a NOx trap.

The hybrid vehicle could be a passenger car, but could also be an on-highway commercial vehicle, such as a refuse truck or an off-highway vehicle, such as a quarry dump truck.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
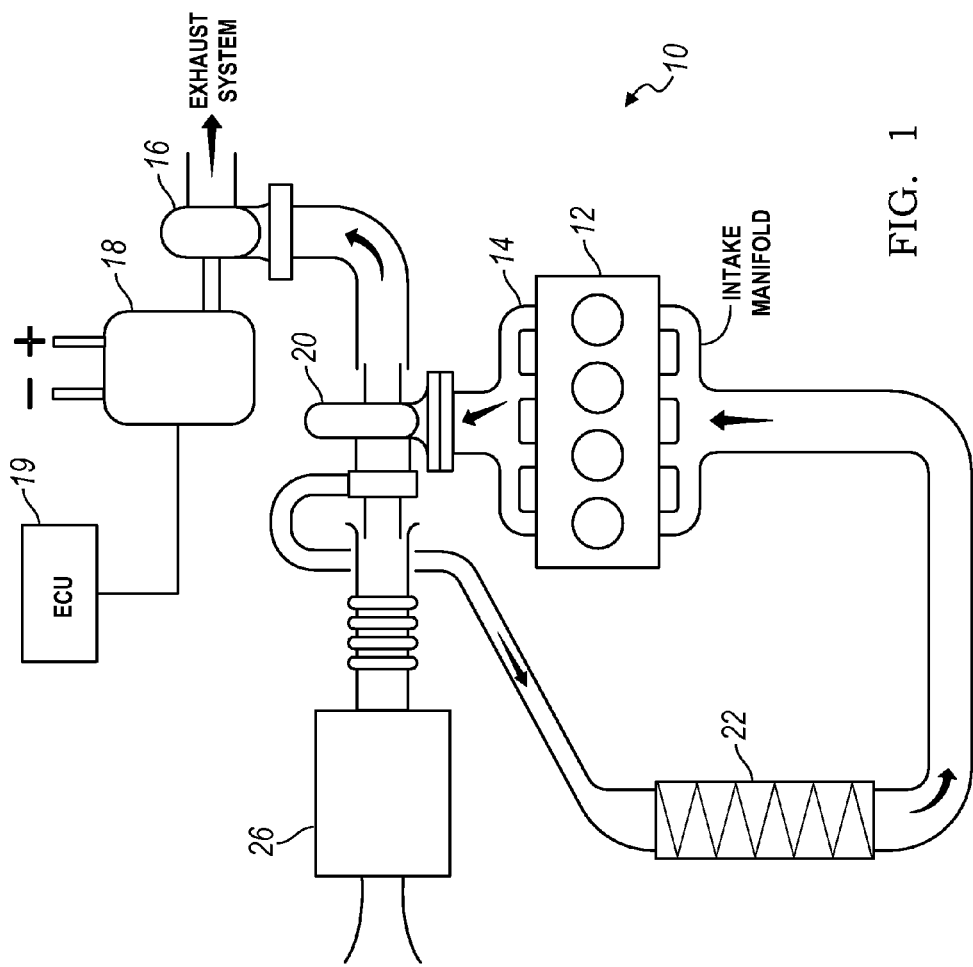
FIG. 1, which is a schematic view of an engine layout in accordance with the present invention.

FIG. 1 shows a hybrid vehicle engine assembly 10, comprising an engine 12, an exhaust manifold 14, a downstream exhaust turbine 16, an electrical generator 18 and an engine control unit (ECU) 19. Other engine assembly components are also present including a variable geometry turbocharger (VGT) 20, intercooler 22, and an air filter 26.

The engine assembly 10 is run as normal except energy is recovered from the turbine 16 and fed to the electrical generator 18. The recovered energy is then used as per a normal hybrid vehicle.

The ECU 19 can vary the load demanded by the generator 18 and therefore the amount of back pressure created by the turbine 16. In turn this affects the running of the engine. Due to the change in back pressure reducing the air flow through the engine, an engine fitted with an intake throttle may be possible to reduce the level of intake throttling. If the turbine 16 is a variable geometry unit the vane position could also be set to optimise the overall efficiency. The overall efficiency can be optimized for a particular engine running condition, or more globally to maximise the benefit of a 'pulse and cruise' running mode.

In such a 'pulse and cruise' mode, the engine 12 is run at higher (but more efficient) loads than usual and exhaust energy is recovered by the turbine, then the vehicle is powered from the generator (or other storage device) at light vehicle loads, with the engine off. The inventors of the present invention have noted that whilst an engine will of course require more fuel at higher loads, the most efficient load on the engine is often higher than that typically run by the user. Thus embodiments of the present invention benefit in that they can increase the loads to a more efficient usage of the engine and then recover energy entering the exhaust via the turbine 16 and electrical generator 18.

To maximise the energy recovered, or to adjust to the energy rate that can be stored, exhaust turbine 16 and/or VGT 20 can be matched to the speed. In this manner the most efficient operating point can be set for a given electrical output. In this way the optimum performance can be achieved between the engine efficiency, the turbine efficiency and the electrical machine efficiency.

In preferred embodiments, any form of inlet throttling is best disabled to maximize the exhaust energy available to be recovered during vehicle decelerations. This includes optimising valve control as well as opening the throttle if fitted. For an engine with cylinder deactivation, all cylinders should be engaged.

Figure 2:
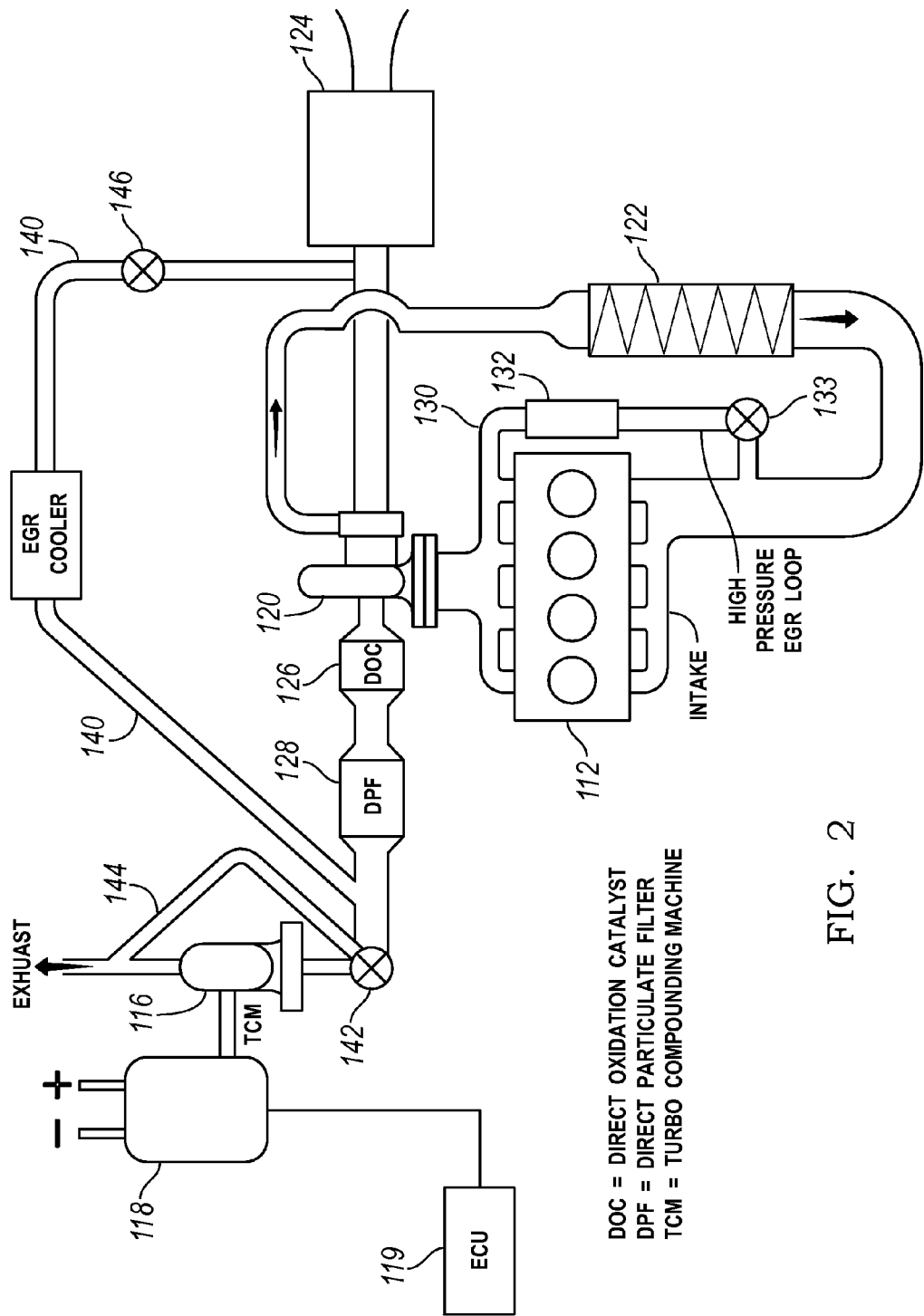
FIG. 2 is an alternative schematic view of an engine layout in accordance with the present invention, showing both high pressure and low pressure EGR loop.

Another embodiment of an engine system 110 of the present invention is shown in FIG. 2 comprising high 130 and low 140 pressure exhaust gas recirculation loops.

Alternative embodiments may comprise either the low 140 or high 130 pressure EGR loops.

In FIG. 2, like parts to those of FIG. 1 share common reference numerals except that they are preceded by a '1.'

The system 110 comprises an engine 112, a high pressure exhaust gas recirculation loop 130 with an EGR cooler 132 and proportional control valve 133; and a turbocharger 120. In the exhaust line downstream of the turbocharger 120, there is a diesel oxidation catalyst (DOC) 126 and a diesel particulate filter (DPF) 128. A turbo-compounder comprising a turbine 116 and battery 118 are provided downstream of the diesel particulate filter 128. A bypass loop 144 is provided around the turbo-compounder 116 and controlled by a proportional valve 142. A low pressure EGR loop 140 is provided upstream of the turbo-compounder 116, 118 and controlled by an EGR valve 146. An air filter 124 and intercooler 122 are also present.

As with all engines, on occasion the pressure of the re-circulated exhaust gas is not high enough to return to the intake side of the engine. An exhaust gas throttle can be provided in order to increase the pressure in order to allow for exhaust gas recirculation. Alternatively a variable geometry turbocharger 120 may be used for the same effect. In either case, however, energy is lost in providing this pressure boost. In contrast, for this embodiment of the present invention some energy may be recovered from the turbine 116. To do this, an ECU 119 increases the load on the turbine 116, which in turn increases the pressure at the outlet of the engine 112 and so pressurises the exhaust flow at the inlet of the high pressure EGR loop 130 to create a pressure differential between the exhaust and the intake manifolds, in order to return to the intake side of the engine and allow for recirculation. Thus some of the energy lost from increasing the pressure in this way is recovered by the turbine 116 and battery 118 in contrast to conventional technique of using the variable geometry turbocharger or a throttle valve to do this, which loses the energy.

Should the low pressure EGR loop 140 require pressure boosting, the turbine 116 may similarly boost pressure as required thus recovering some energy which would normally be lost e.g. by a throttle valve.

In this manner, EGR can be used with less or no need for an EGR exhaust throttle.

The bypass 144 is used to avoid any negative losses at very light load. This can also be used whilst undertaking regeneration of an after treatment device if the exhaust is too cold, such as a diesel particulate trap.

Embodiments of the invention benefit in that the device can be placed downstream of the particulate trap, as shown in FIG. 2. It can then be used to assist in the regeneration of the particulate trap, by increasing back pressure on the engine to increase load (therefore more fuel and hotter exhaust) and reducing the air flow through the engine (therefore hotter exhaust and also lower NOx due to more internal EGR).

The ECU 119 may determine appropriate occasions where such pressure boosting is required by reacting to information gained from sensors, and/or by using a predictive model.

Normally in use, the ECU 119 calculates the fuel demand and other settings, such as injection timing, AFR required, etc. to achieve the desired power to the gearbox.

Thus the ECU 119 can determine the optimum position of the turbo-compounder and the load demanded of it, in order to manipulate the EGR loops and/or control the intake from the engine.

The proportional bypass valve 142 controlling the bypass around the turbocompounder 116, the variable geometry turbocharger 120 and the proportional EGR valve 133 can be manipulated in order to emphasise the different control effects afforded by the turbo compounder's changing load. For example, when manipulating conditions downstream of the turbo-compounder 116, the bypass valve 142 around the turbo-compounder 116 may be used in order to minimise the back pressure effects of the turbo-compounders varying loads. It could also be controlled via the electrical load on generator 18 via the ECU.

Figure 3:
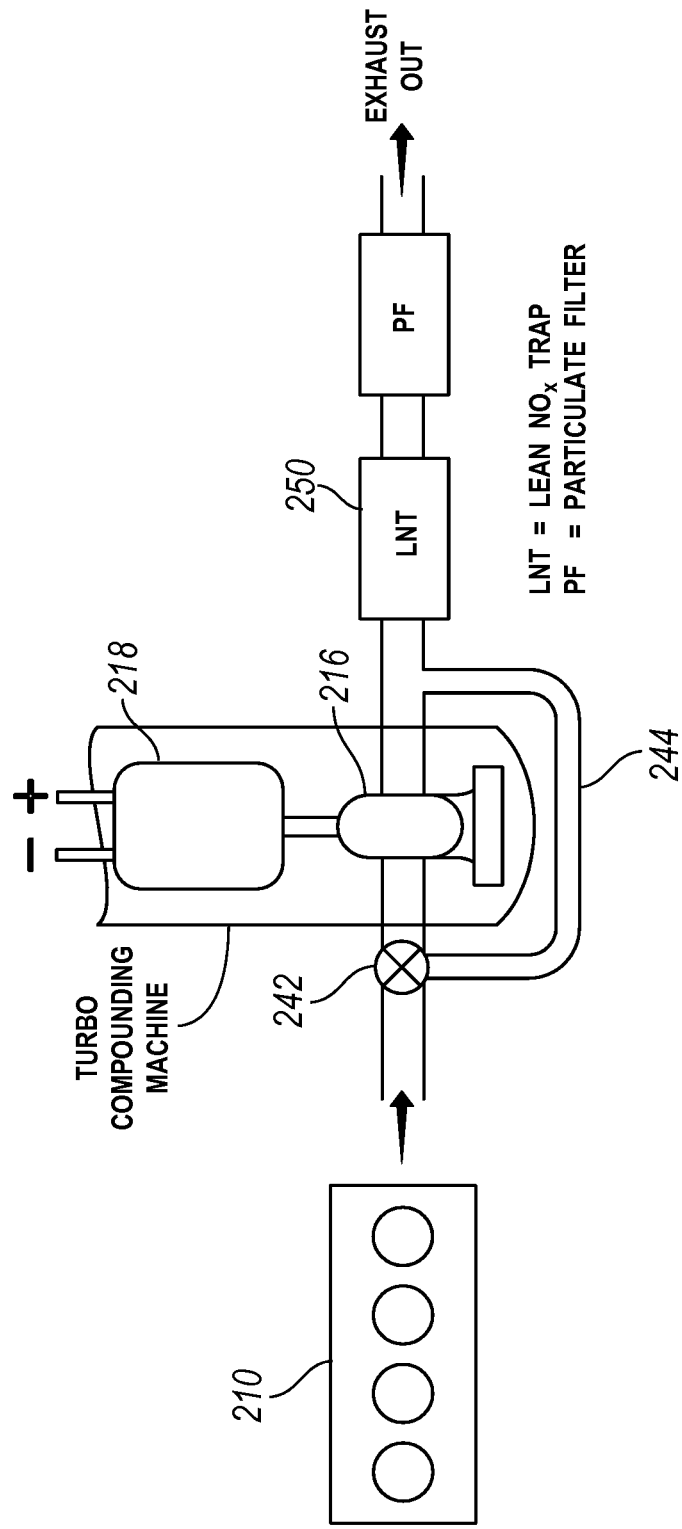
FIG. 3 is a yet further schematic view of an engine layout showing the present of a Lean NOx trap.

In FIG. 3 like parts to those of FIGS. 1 and 2 share common reference numerals except that they are preceded by a '2.'

FIG. 3 shows an alternative embodiment where, the turbo-compounding device 216, 218 in combination with a bypass 244 can also be placed downstream of an engine 210 but upstream of a lean NOx trap (LNT) 250. There is a narrow peak efficiency temperature window for absorbing NOx and for reducing the stored NOx, during short rich exhaust running periods. There is also a temperature at which the device will release NOx if it is exceeded. Hence this device can be used to assist with the ideal function of the LNT 250. An LNT is normally much cheaper than a selective catalytic reduction (SCR) system. Moreover the position of the LNT may be varied in order to achieve optimum operating temperature.

Thus embodiments achieve the desired pressure differential using the turbocompounding unit rather than excessively closing the main engine VGT or replacing an exhaust throttle.

In alternative embodiments, the energy conversion/store does not need to be a generator but can be a capacitor, flywheel or any combination of these rather than a generator. Various components in the hybrid car can then be run off the flywheel, capacitor etc. Preferred embodiments however allow for rapid charging to maximize the energy that can be recovered.

In accordance with the provisions of the patent statutes, the preferred embodiment has been described. However, it should be noted that the alternate embodiments can be practiced otherwise than as specifically illustrated and described without departing from the scope of the invention.

The invention claimed is:

1. An engine assembly comprising:
an internal combustion engine having an exhaust;
first and second turbines driven by said exhaust;
an energy storage mechanism coupled to the second turbine for storing energy recovered from said exhaust by said second turbine;
an exhaust treatment device in an exhaust stream between the first and second turbines;
an exhaust gas recirculation loop including an inlet between the engine and the first turbine and an outlet connected to an engine air inlet between a compressor driven by the first turbine and the engine; and
an engine control unit that controls the energy storage mechanism and that controls recirculation of exhaust gases in the exhaust gas recirculation loop by manipulating back pressure of the engine by varying the rate of storing energy in the energy storage mechanism.

2. The engine assembly as claimed in claim 1, wherein the energy storage mechanism comprises a generator to convert mechanical power from the second turbine to electrical power.

3. The engine assembly as claimed in claim 2, including the engine control unit varying voltage demanded by the generator which varies the rate of storing energy, a load of the second turbine and the back pressure.

4. The engine assembly as claimed in claim 1, including the engine control unit controlling an output power of the engine by manipulating the back pressure of the engine via the second turbine.

5. The engine assembly as claimed in claim 1, wherein the exhaust gas recirculation loop further comprises a second inlet between the first and second turbines and a second outlet connected to an engine air inlet upstream of a compressor driven by the first turbine.

6. The engine assembly as claimed in claim 1, including the engine control unit controlling the energy storage mechanism and the engine to operate the engine as an air pump during vehicle deceleration.

7. The engine assembly as claimed in claim 1, including a bypass and a bypass valve for diverting the exhaust to bypass the second turbine, the exhaust treatment device is a particulate trap, and the engine control unit controls the energy storage mechanism and the bypass valve to regenerate the particulate trap.

8. The engine assembly as claimed in claim 1, installed in a hybrid electric vehicle.

9. The engine assembly as claimed in claim 8, wherein the vehicle takes electrical power for on-board electronics from the energy storage mechanism.

10. The engine assembly as claimed in claim 8, wherein the vehicle recovers some of the energy lost when braking.

11. The engine assembly as claimed in claim 8, including the engine control unit increasing load on the engine by increasing the rate of storing energy in the energy storage mechanism, moving the engine to a higher efficiency operating point, and running a vehicle at least in part from the energy storage mechanism.

12. An engine assembly comprising:
an internal combustion engine having an exhaust;
first and second turbines driven by the exhaust;
an energy storage mechanism driven by the second turbine for storing energy recovered by the second turbine;
an exhaust gas recirculation loop including an inlet between the engine and the first turbine and an outlet connected to an engine air inlet between a compressor driven by the first turbine and the engine;
a bypass and a bypass valve for diverting the exhaust to bypass the second turbine;
a particulate trap in an exhaust stream between the first and second turbines; and
an engine control unit that controls the energy storage mechanism and the bypass valve to regenerate the particulate trap.

13. The engine assembly of claim 12, including an exhaust treatment device in an exhaust stream between the first and second turbines.

14. An engine assembly comprising:
an internal combustion engine having an exhaust;
first and second turbines driven by the exhaust;
an energy storage mechanism coupled to the second turbine for storing energy recovered from said exhaust by said second turbine;
a particulate trap in an exhaust stream between the first and second turbines;
a bypass and a bypass valve for diverting the exhaust to bypass the second turbine; and
an engine control unit that controls the energy storage mechanism and the bypass valve to regenerate the particulate trap.

* * * * *

UNITED STATES PATENT AND TRADEMARK OFFICE
CERTIFICATE OF CORRECTION

| | |
|---|---|
| PATENT NO. | : 9,441,532 B2 |
| APPLICATION NO. | : 13/928637 |
| DATED | : September 13, 2016 |
| INVENTOR(S) | : Ian G. Pegg and Robert Helle-Lorentzen |

It is certified that error appears in the above-identified patent and that said Letters Patent is hereby corrected as shown below:

Title Page of Patent, Item (72)

The Inventor, "Ian A. Pegg, Chelmsford, Essex UK" should read
Ian G. Pegg, Chelmsford, Essex UK Signed and Sealed this
Twenty-fifth Day of October, 2016

Michelle K. Lee
*Director of the United States Patent and Trademark Office*